(12) United States Patent
Golm et al.

(10) Patent No.: US 11,794,560 B2
(45) Date of Patent: Oct. 24, 2023

(54) COMPOSITE COMPONENT WITH INTEGRATED CONDUIT

(71) Applicant: GM GLOBAL TECHNOLOGY OPERATIONS LLC, Detroit, MI (US)

(72) Inventors: Erik B. Golm, Warren, MI (US); Venkateshwar R. Aitharaju, Troy, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 17/395,577

(22) Filed: Aug. 6, 2021

(65) Prior Publication Data

US 2023/0044492 A1    Feb. 9, 2023

(51) Int. Cl.
*B60J 5/10* (2006.01)
*B60S 1/48* (2006.01)
*B29C 45/14* (2006.01)

(52) U.S. Cl.
CPC ......... *B60J 5/107* (2013.01); *B29C 45/14065* (2013.01); *B29C 45/14467* (2013.01); *B29C 45/14598* (2013.01); *B29C 45/14819* (2013.01); *B29C 45/14836* (2013.01); *B60S 1/48* (2013.01); *B29K 2715/003* (2013.01)

(58) Field of Classification Search
CPC ... B60J 5/107; B60J 5/108; B60S 1/58; B60S 1/48; B29K 2715/003; B29C 45/14065; B29C 45/14467; B29C 45/14598; B29C 45/14819; B29C 45/14836; B60R 13/07
USPC ..................... 296/106, 146.5, 154
See application file for complete search history.

(56) References Cited

U.S. PATENT DOCUMENTS

2010/0326555 A1* 12/2010 Junger ................... F02M 55/00
 138/44
2018/0345767 A1* 12/2018 Chaaya ................. B29C 66/301

FOREIGN PATENT DOCUMENTS

EP        3037290 A1 *  6/2016 ............. B60J 5/107
FR        3035035 A1 * 10/2016 ............. B60J 5/101
JP     2004359025 A  * 12/2004

OTHER PUBLICATIONS

Onozawa Hiroyuki, JP-2004359025-A, machine translation, Dec. 24, 2004 (Year: 2004).*

* cited by examiner

*Primary Examiner* — Amy R Weisberg
*Assistant Examiner* — Wenwei Zhuo
(74) *Attorney, Agent, or Firm* — Quinn IP Law

(57) ABSTRACT

An injection molded composite component includes a groove extending from a first surface of the composite component and a tubing material placed within the groove and formed integrally with the composite component such that the tubing material forms an integrated conduit on the first surface of the composite component.

14 Claims, 7 Drawing Sheets

COMPOSITE COMPONENT WITH INTEGRATED CONDUIT

INTRODUCTION

The present disclosure relates generally to a vehicle component, such as a liftgate, having an integrated conduit formed therewith via a molding process.

Tubing, such as that for windshield wiper fluid, is often attached to the vehicle component, such as the liftgate, using clips or other types of mechanical fasteners. This assembly increases manufacturing complexity and assembly time.

SUMMARY

Embodiments according to the present disclosure provide a number of advantages. For example, embodiments according to the present disclosure enable integration of tubing and/or wiring with vehicle components by integrating a conduit with the vehicle components during an over molding manufacturing process.

In one aspect of the present disclosure, a composite component includes a first surface and a conduit integrated with the first surface and having a first end extending from the conduit at a first position of the composite component and a second end extending from the conduit at a second position of the composite component. The conduit protrudes from the first surface of the composite component.

In some aspects, one of a rubber tube, a plastic tube, a metal tube, a bare wire, and a shielded wire is molded into the first surface of the composite component.

In some aspects, the first surface comprises a resin layered on a preform, and the conduit comprises a tubing material bonded to the preform with the resin such that the resin is formed around the tubing material.

In some aspects, the preform includes a first preform and a second preform and the tubing material is encircled by the second preform such that the tubing material is between the first and second preforms.

In some aspects, the first surface includes a groove protruding from the first surface and the groove is configured to receive one of a tube and a wire.

In some aspects, the conduit includes a tubing material surrounded by a foam material, and the tubing material and the foam material are over molded with the first surface.

In some aspects, the conduit is formed by a cavity in a foam material and the foam material is over molded with the first surface.

In some aspects, an interior surface area of the cavity is coated with a sealant.

In some aspects, the composite component is a vehicle liftgate and the conduit is configured to transfer windshield wiper fluid.

In another aspect of the present disclosure, a method for manufacturing a composite component with an integrated conduit includes providing a first mold for the composite component, placing a preform on the first mold, placing a tubing material on the preform, placing a second mold for the composite component on the assembly comprising the first mold, the preform, and the tubing material such that the preform and tubing material are between the first and second molds, and performing an over molding process by injecting a resin between the first and second molds such that the tubing material is encapsulated by the resin and formed integrally with the composite component.

In some aspects, the first mold includes a groove configured to receive the tubing material.

In some aspects, the preform includes a first preform and a second preform, and the method includes placing the tubing material on the first preform and placing the second preform on top of the tubing material.

In some aspects, the tubing material is enclosed by a foam material, and both the tubing material and the foam material are encapsulated by the resin during the over molding process.

In some aspects, the method further includes pressurizing the tubing material during the resin injection to prevent compression of the tubing material during the over molding process.

In some aspects, the second mold includes a groove configured to receive the tubing material.

In some aspects, the tubing material is one of a rubber tube, a plastic tube, a metal tube, a bare wire, and a shielded wire.

In another aspect of the present disclosure, an injection molded composite component includes a groove extending from a first surface of the composite component and a tubing material placed within the groove and formed integrally with the composite component such that the tubing material forms an integrated conduit on the first surface of the composite component.

In some aspects, the tubing material comprises one of a rubber tube, a plastic tube, a metal tube, a bare wire, and a shielded wire is molded into the first surface of the composite component.

In some aspects, the tubing material is enclosed within a foam material, and the tubing material and the foam material are over molded with the first surface.

In some aspects, the tubing material is pressurized.

BRIEF DESCRIPTION OF THE DRAWINGS

The present disclosure will be described in conjunction with the following figures, wherein like numerals denote like elements.

Figure 1:
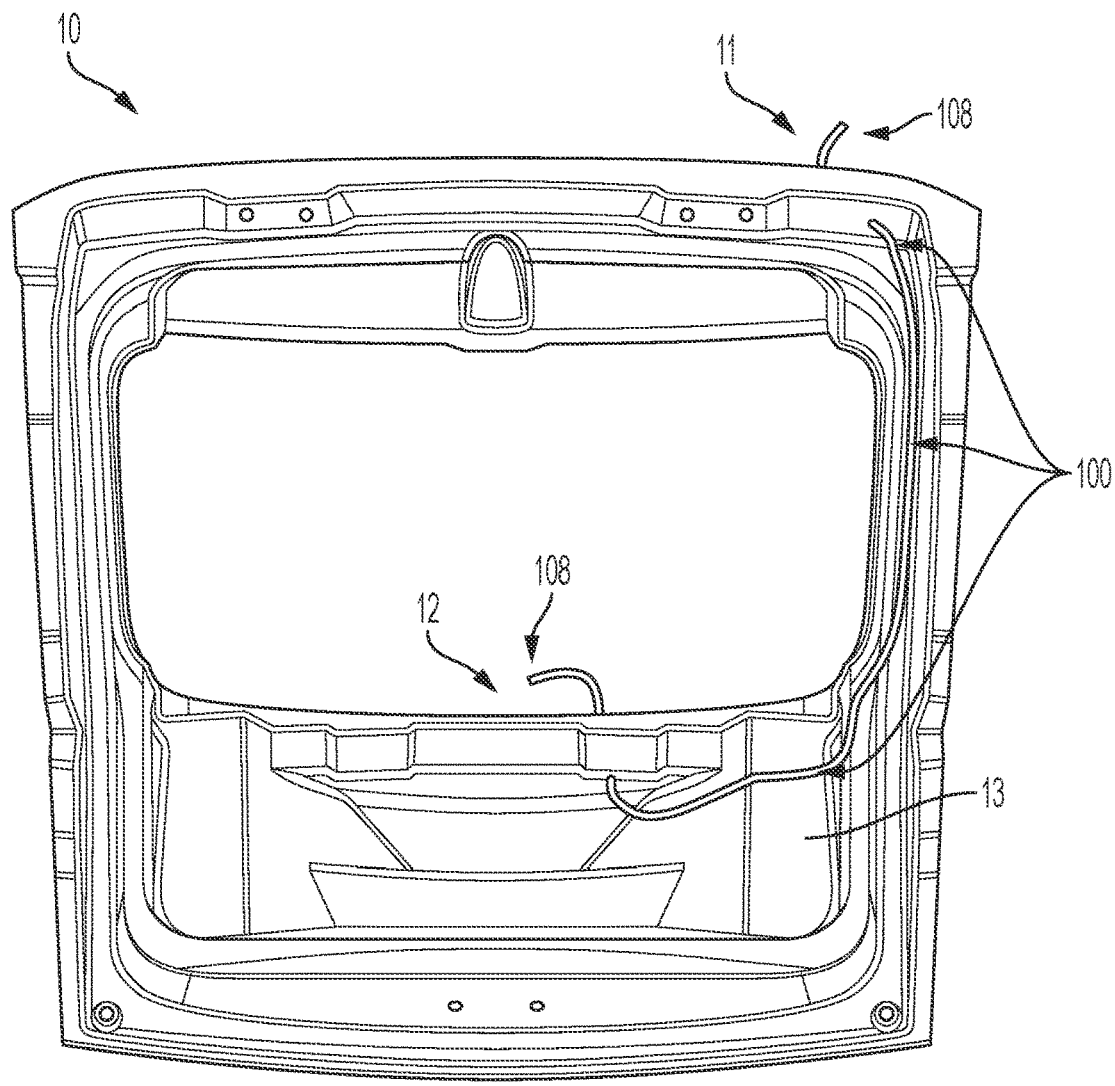
FIG. 1 is a schematic view of an underside of a vehicle component including integrated conduit, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the following description, like reference numbers refer to like components.

Figure 2:
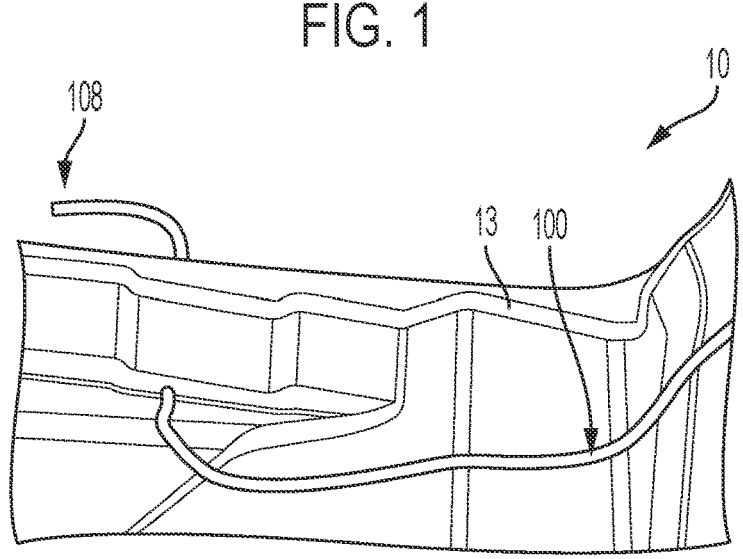
FIG. 2 is a schematic view of illustrating a free end of tubing extending from an integrated conduit of the vehicle component of FIG. 1.

A vehicle component, such as a vehicle liftgate 10, is illustrated in FIGS. 1 and 2. In this embodiment, the liftgate 10 is formed from a composite material via an over mold process. As part of the over mold process, an integrated conduit 100 is formed with the liftgate 10 on a first or interior surface 13 of the liftgate 10. The integrated conduit 100 provides a conduit for fluid and/or electrical wiring from a first position 11 of the liftgate 10 to a second position 12. In various embodiments, the integrated conduit 100 includes a tubing material 108 that extends from the liftgate 10 to enable connection with other vehicle components, such as a fluid reservoir, etc., for example and without limitation. In one example, the integrated conduit 100 includes a tubing material 108 that is a fluid conduit to deliver fluid from a fluid reservoir to a windshield wiper assembly. In another example, the integrated conduit 100 is a molded conduit that includes a female port such that a male port may be coupled directly to the integrated conduit 100 without requiring additional tubing.

Figure 3:
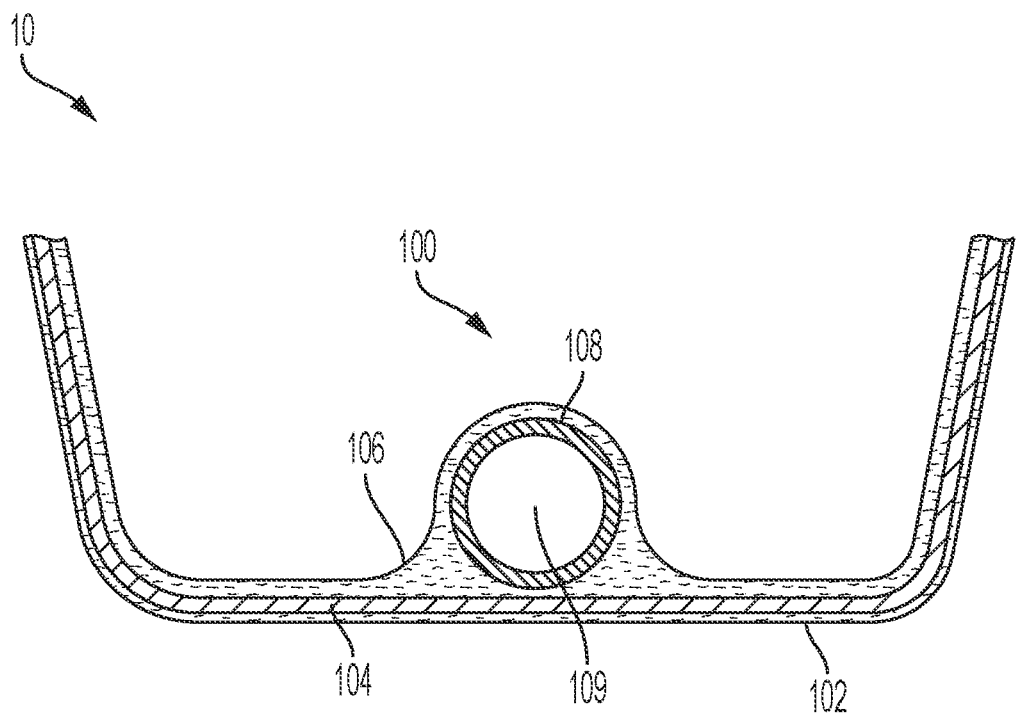
FIG. 3 is a schematic cross-sectional view of a vehicle component including an integrated conduit, according to an embodiment.
Figure 4:
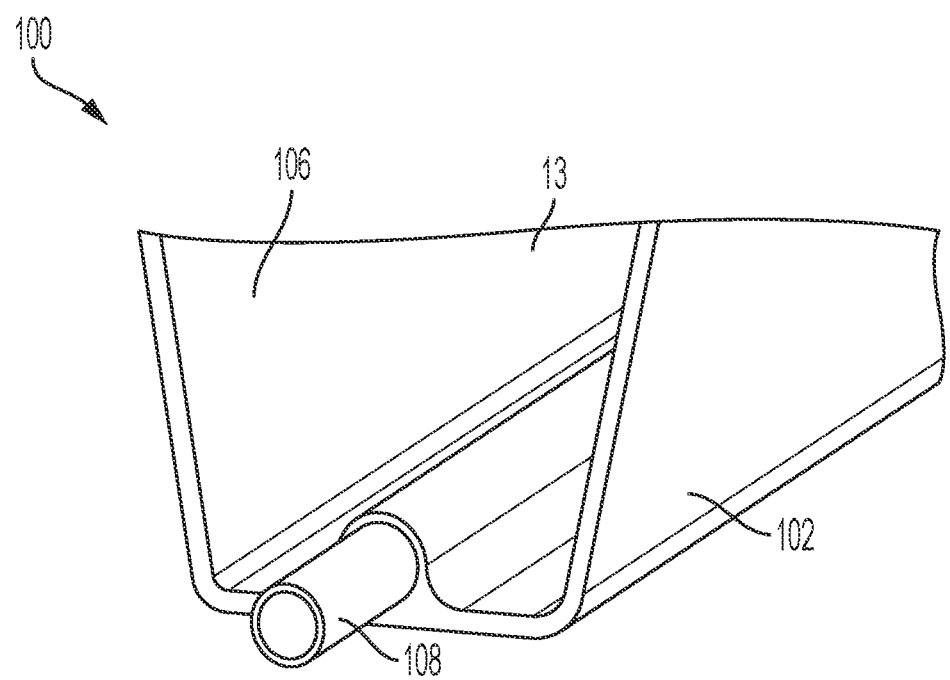
FIG. 4 is a schematic perspective view of a vehicle component including an integrated conduit, according to an embodiment.

FIG. 3 illustrates a cross-section of the conduit 100 formed as part of the liftgate 10 shown in FIG. 1. FIG. 4 illustrates a perspective view of the conduit 100. The conduit 100 is formed via an over molding process that includes a first layer of resin 102 on a first side of a preform 104. A second layer of resin 106 is formed around a tubing material 108 placed on the preform 104 at the desired location of the conduit 100. The tubing material 108 forms an enclosed duct (illustrated in cross-section as the opening 109) through which a fluid and/or a wire extends. In various embodiments, a groove protrudes from the surface of the composite component, such as a vehicle liftgate, at the desired location of the conduit 100. The groove receives the tubing material 108, which is, in various embodiments, a rubber tube, a plastic tube, a metal tube, a bare wire, and/or a shielded wire, for example and without limitation, which is then molded into the composite component, as shown in FIG. 1.

Figure 5:
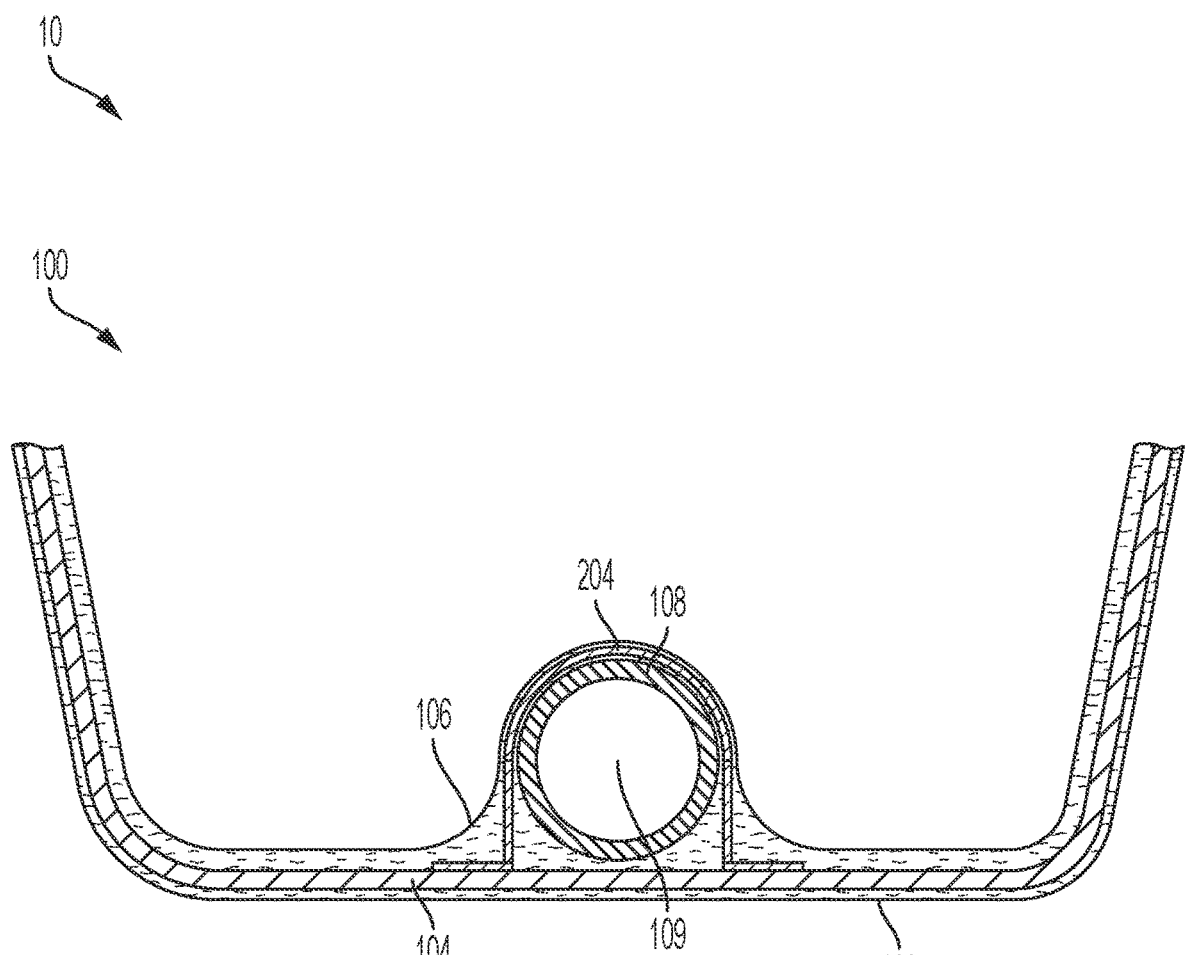
FIG. 5 is a schematic cross-sectional view of a vehicle component including an integrated conduit, according to another embodiment.

In various embodiments, the formation of the conduit 100 within the composite component, such as the liftgate 10, includes a layer of preform added on top of the tubing material, as shown in FIG. 5. In this embodiment, similar to the embodiment shown in FIG. 3, the conduit 100 is formed via an over molding process that includes a first layer of resin 102 on a first side of a first preform 104. A second preform 204 is added on top of the tubing material 108. In various embodiments, the second preform 204 encloses the tubing material 108 between the first preform 104 and the second preform 204. A second layer of resin 106 is formed around the tubing material 108 and is layered on top of a second, or opposite, side of the first preform 104. The tubing material 108 forms an enclosed duct (illustrated in cross-section as the opening 109) through which a fluid and/or a wire extends.

Figure 6:
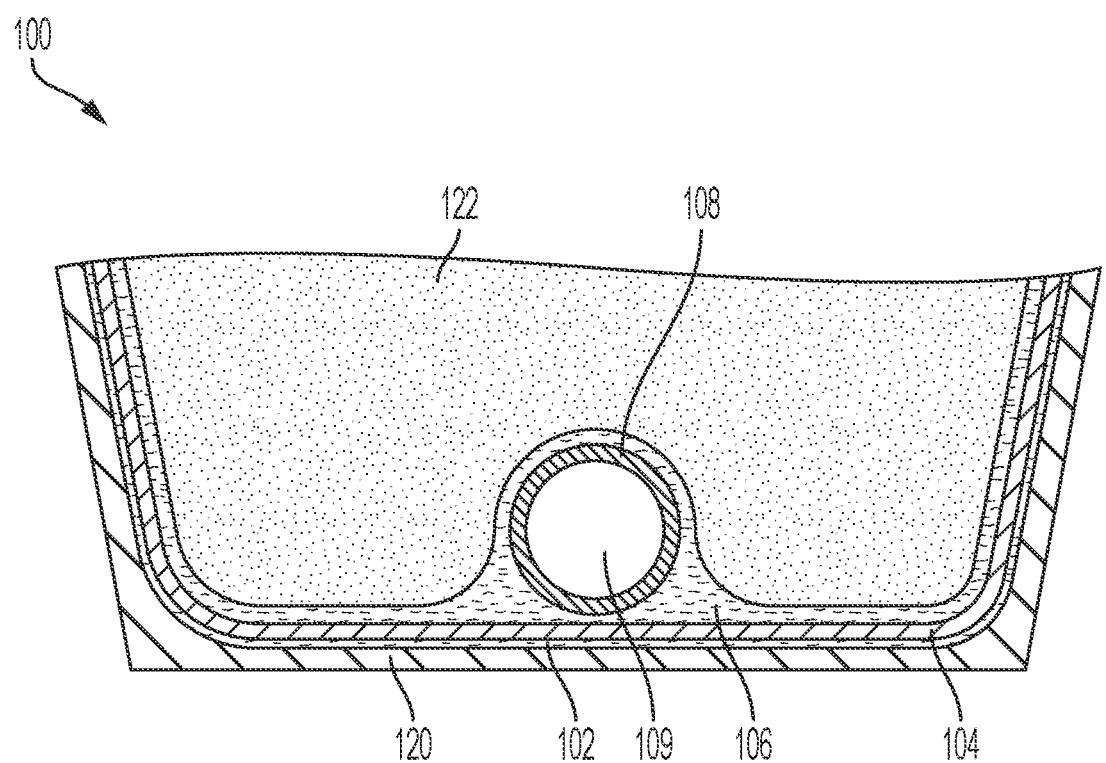
FIG. 6 is a schematic cross-sectional view of an over molding configuration to manufacture a vehicle component with an integrated conduit, according to an embodiment.

Another example of the manufacturing process of the conduit 100 is schematically illustrated in FIG. 6. In this example, the conduit 100 is formed via an over molding process. The preform 104 is placed on a lower mold 120. The tubing material 108 is placed at the desired location on the preform 104 and an upper mold 122 is placed on top of the lower mold 120 and the tubing material 108. Resin is then injected to the assembly, forming the first layer of resin 102 between the lower mold 120 and the first side of the preform 104 and the second layer of resin 106 encompassing the tubing material 108 and covering the second side of the preform 104. In various embodiments, a fluid such as air is pumped through the opening 109 defined by the tubing material 108 to prevent the tubing material 108 from crushing during the resin injection step of the over molding process.

Figure 7:
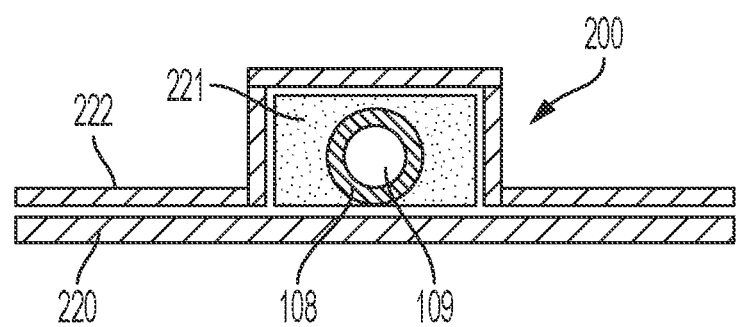
FIG. 7 is a schematic cross-sectional view of another over molding configuration to manufacture a vehicle component with an integrated conduit, according to an embodiment.
Figure 8:
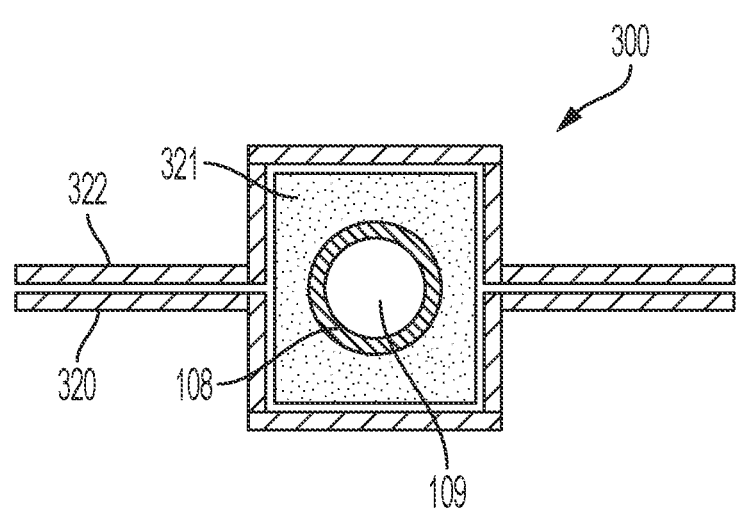
FIG. 8 is a schematic cross-sectional view of another over molding configuration to manufacture a vehicle component with an integrated conduit, according to an embodiment.

In some embodiments, as shown in FIGS. 7 and 8, a foam material is used to resist compression of the tubing material 108 during the over molding process. With reference to FIG. 7, the conduit 200 includes a first layer of composite material or resin 220. The tubing material 108 is surrounded by a foam material 221. A second layer of composite material or resin 222 is layered over the foam material 221 and tubing material 108. The foam material 221 encloses the tubing material 108 such that the tubing material 108 is not crushed or compressed during the application of the first and second layers of composite material 220, 222.

Similarly, as shown in FIG. 8, the conduit 300 includes the foam material 321 that surrounds the tubing material 108 on all sides, with the first and second composite materials 320, 322 layered over the foam material 321. Each of the conduits 200, 300 are formed with foam material surrounding the tubing material to resist compression of the tubing material during the over molding process and are configured for various applications depending on the use for the conduit and space constraints.

In some embodiments, the tubing material 108 is replaced by a sealant that coats an interior surface of a cavity formed within the foam material. The interior surface area of the cavity is coated with a sealant material to prevent leakage. Similar to the embodiments shown in FIGS. 7 and 8, the foam material is molded into the composite component and the cavity acts as the conduit having the opening 109 for electrical wiring and/or fluid.

Figure 9:
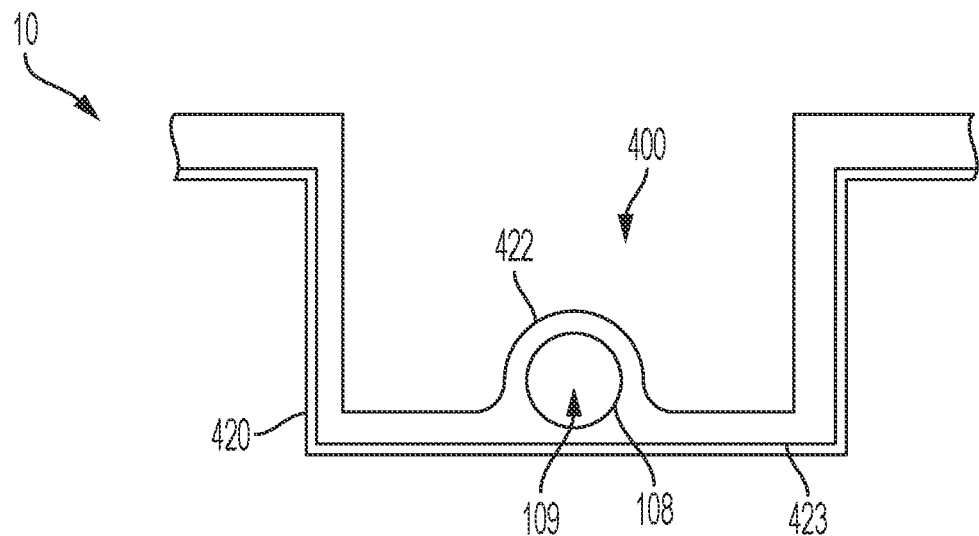
FIG. 9 is a schematic cross-sectional view of another over molding configuration to manufacture a vehicle component with an integrated conduit, according to an embodiment.
Figure 10:
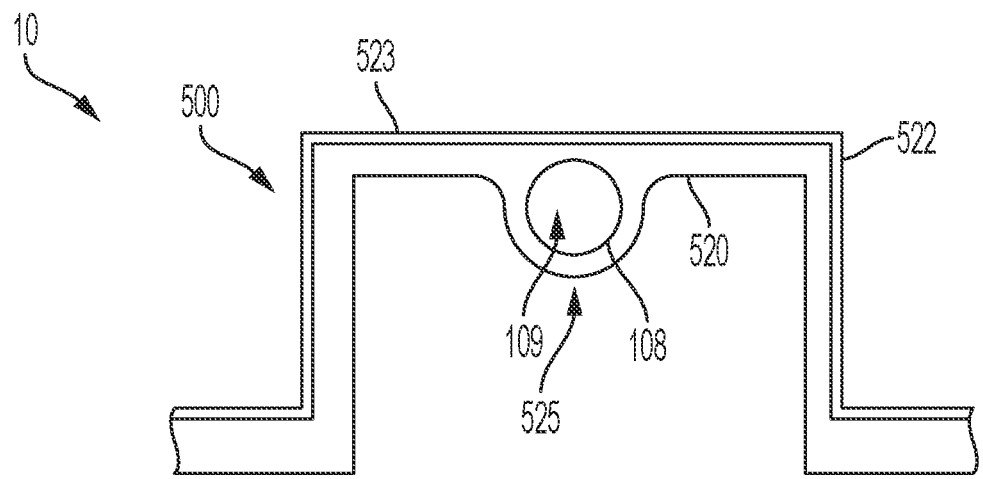
FIG. 10 is a schematic cross-sectional view of another over molding configuration to manufacture a vehicle component with an integrated conduit, according to an embodiment.

FIGS. 9 and 10 schematically illustrate two embodiments of forming a conduit 400, 500, depending on the configuration of the mold. In FIG. 9, a first cavity mold 420 is covered with a fabric layer 423. The tubing material 108 is placed on the fabric layer 423 and a second cavity mold 422 is placed over the tubing material 108. Resin is then injected into the mold to secure the tubing material 108 in the desired location. However, it can be seen that placing the tubing material 108 in this mold configuration can be difficult, as the tubing material 108 is not restrained side to side within the first cavity mold 420.

As shown in FIG. 10, the tubing material 108 is placed within a well or groove 525 formed in the first cavity mold 520. The groove 525 holds the tubing material 108 in place within the mold. As in the configuration shown in FIG. 9, a fabric layer 523 covers the first cavity mold 520. A second cavity mold 522 is placed over the tubing material 108 and resin is injected during the molding process to integrate the tubing material 108 with the composite component, such as the component 10 shown in FIG. 1. The groove 525 is shown in FIG. 10 as a circular groove; however, in some embodiments the groove may be rectangular, elliptical, or any other shape depending on the desired shape of and use for the conduit 500 (that is, whether the conduit 500 encloses wiring or fluid, and the position of the conduit 500 within the component 10).

Figure 11:
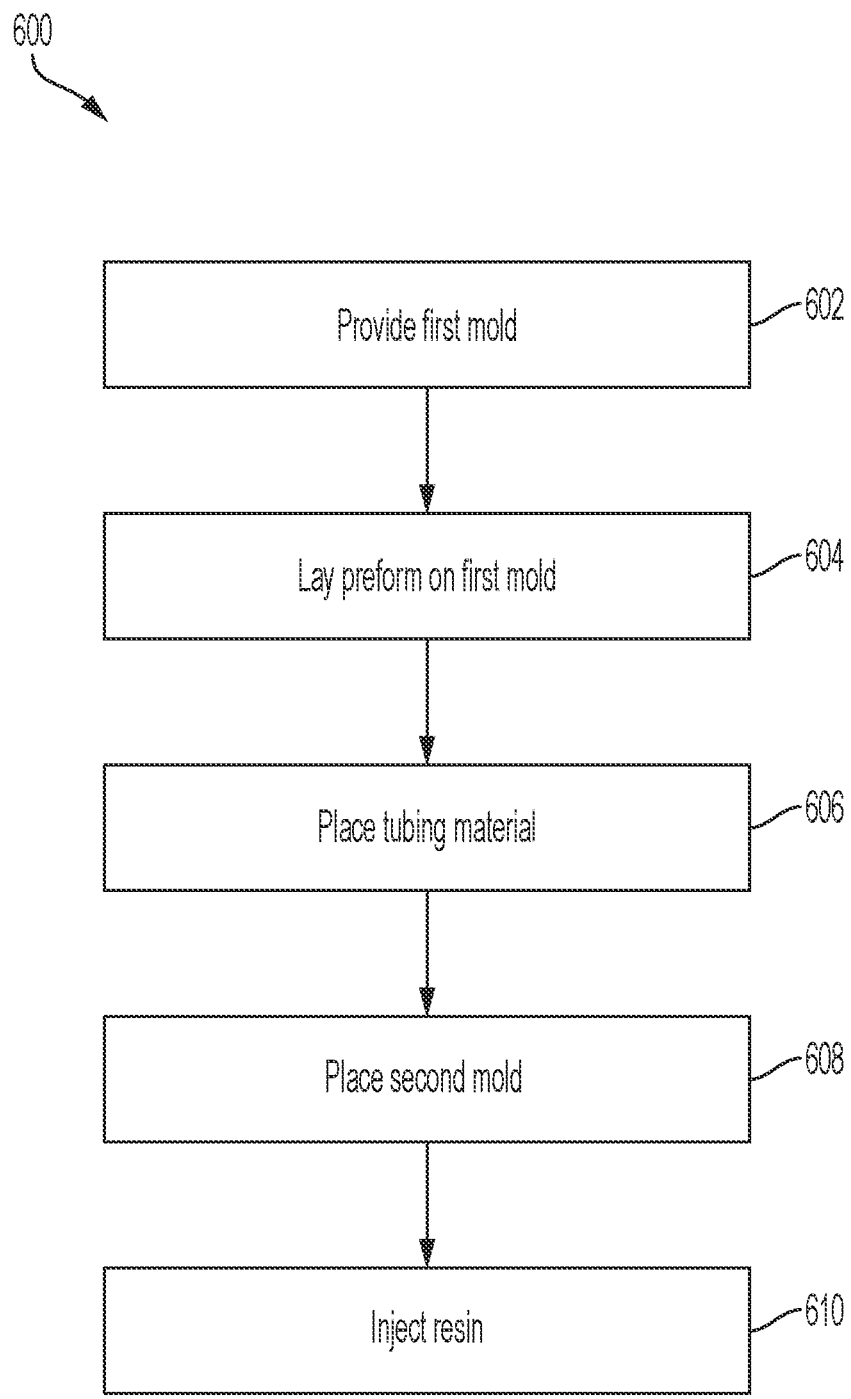
FIG. 11 is a flow chart diagram of a method for manufacturing a vehicle component with an integrated conduit, according to an embodiment.

FIG. 11 illustrates a method 600 to manufacture a component including an integrated conduit. The method 600 can be utilized in connection with any of the conduits 100, 200, 300, 400, 500 discussed herein. The order of operation of the method 600 is not limited to the sequential execution as illustrated in FIG. 11, but may be performed in one or more varying orders, or steps may be performed simultaneously, as applicable in accordance with the present disclosure.

The method 600 begins at 602 when a first mold for a composite component is provided. The method 600 continues at 604 when a preform placed on the first mold. The tubing material is placed on the preform at the desired location, as shown at 606. In some embodiments, the tubing material is placed within a groove in the first mold. In some embodiments, the tubing material is placed on a flat portion of the first mold. In some embodiments, as shown in FIGS. 7 and 8, the tubing material is encircled by a foam material to protect the tubing material from compression during the resin injection step of the molding process.

The method 600 continues at 608 with placement of the second mold over the first mold, preform, and tubing material assembly. Finally, at 610, resin is injected into the mold, filling the spaces between the first and second molds and encapsulating the tubing material such that it is integrated into the molded composite component.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such condition language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A composite component, comprising:
    a first surface; and
    a conduit integrated with the first surface and having a first end extending from the conduit at a first position of the composite component and a second end extending from the conduit at a second position of the composite component;
    wherein the conduit protrudes from the first surface of the composite component, the first surface comprises a resin layered on a preform, and the conduit comprises a tubing material bonded to the preform with the resin such that the resin is formed around the tubing material.

2. The composite component of claim 1, wherein one of a rubber tube, a plastic tube, a metal tube, a bare wire, and a shielded wire is molded into the first surface of the composite component.

3. The composite component of claim 1, wherein the preform includes a first preform and a second preform and the tubing material is encircled by the second preform such that the tubing material is between the first and second preforms.

4. The composite component of claim 1, wherein the first surface includes a groove protruding from the first surface, and the groove is configured to receive one of a tube and a wire.

5. The composite component of claim 1, wherein the composite component is a vehicle liftgate and the conduit is configured to transfer windshield wiper fluid.

6. A method for manufacturing a composite component with an integrated conduit, comprising:

providing a first mold for the composite component;

placing a preform on the first mold;

placing a tubing material on the preform;

placing a second mold for the composite component on an assembly comprising the first mold, the preform, and the tubing material such that the preform and tubing material are between the first and second molds; and performing an over molding process by injecting a resin between the first and second molds such that the tubing material is encapsulated by the resin and formed integrally with the composite component, wherein the tubing material is enclosed by a foam material, and both the tubing material and the foam material are encapsulated by the resin during the over molding process.

7. The method of claim 6, wherein the first mold includes a groove configured to receive the tubing material.

8. The method of claim 6, wherein the preform includes a first preform and a second preform, and the method includes placing the tubing material on the first preform and placing the second preform on top of the tubing material.

9. The method of claim 6 further comprising pressurizing the tubing material when injecting the resin to prevent compression of the tubing material during the over molding process.

10. The method of claim 6, wherein the second mold includes a groove configured to receive the tubing material.

11. The method of claim 6, wherein the tubing material is one of a rubber tube, a plastic tube, a metal tube, a bare wire, and a shielded wire.

12. An injection molded composite component, comprising:
    a groove extending from a first surface of the composite component; and
    a tubing material placed within the groove and formed integrally with the composite component such that the tubing material forms an integrated conduit on the first surface of the composite component, wherein the tubing material is enclosed within a foam material, and the tubing material and the foam material are over molded with the first surface.

13. The composite component of claim 12, wherein the tubing material comprises one of a rubber tube, a plastic tube, a metal tube, a bare wire, and a shielded wire is molded into the first surface of the composite component.

14. The composite component of claim 12, wherein the tubing material is pressurized.

* * * * *